Jan. 23, 1951     O. P. WYATT     2,538,854
FLASHING DIRECTION SIGNAL FOR MOTOR VEHICLES
Filed April 4, 1949
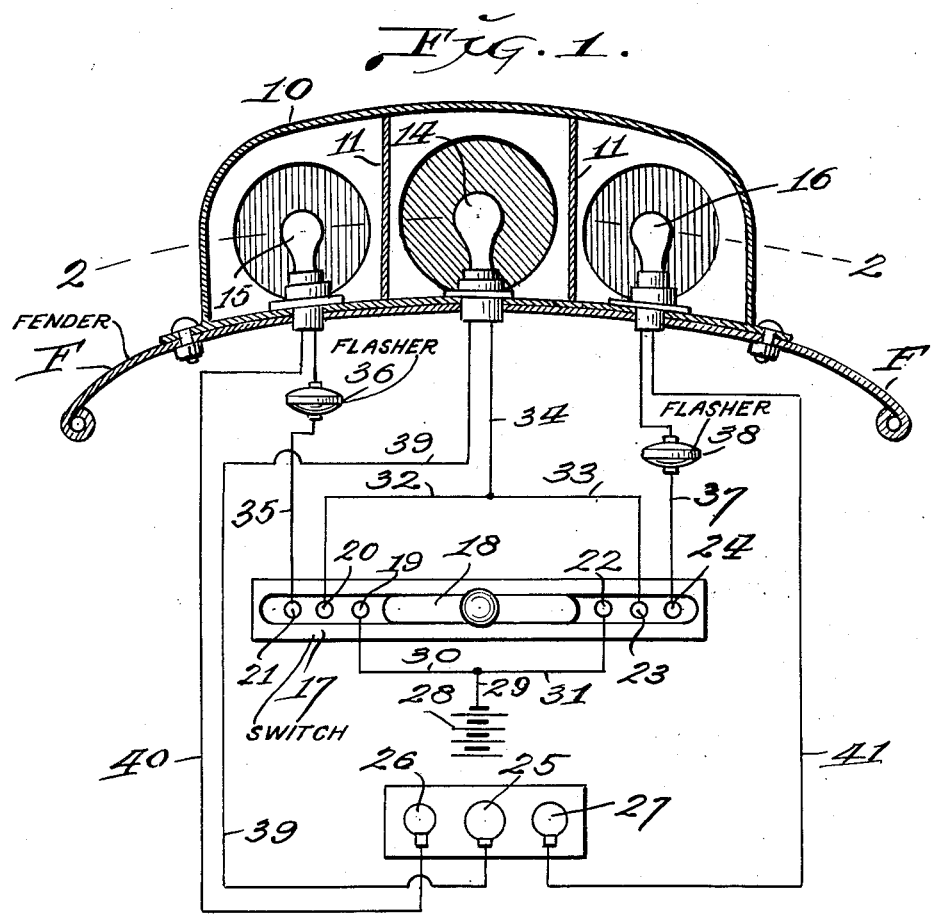
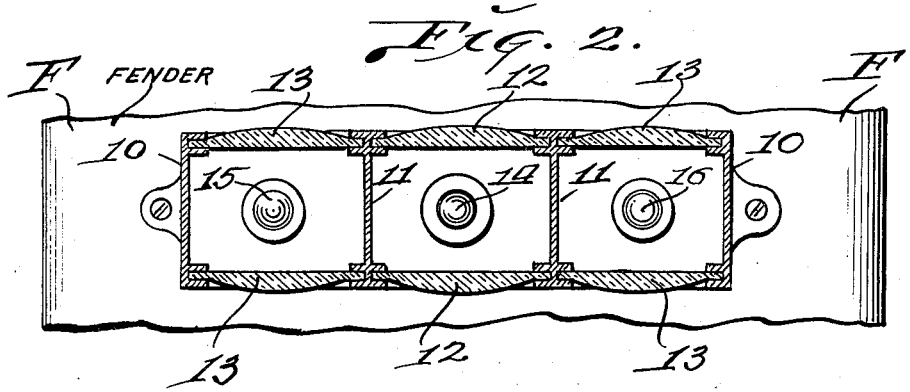
INVENTOR.
OSCAR P. WYATT.
BY
Martin P. Smith,
ATTY.

Patented Jan. 23, 1951

2,538,854

UNITED STATES PATENT OFFICE 2,538,854

FLASHING DIRECTION SIGNAL FOR MOTOR VEHICLES

Oscar P. Wyatt, Forest Home, Calif.

Application April 4, 1949, Serial No. 85,369

1 Claim. (Cl. 177—329)

My invention relates to that type of flashing direction signal for motor vehicles shown in United States Letters Patent Number 1,848,685 issued to me, March 8, 1932, and the principal objects of my present invention are; to generally improve upon the construction of the signal covered by my aforesaid patent, as well as other similar types of flashing motor vehicle signals, to provide a signal of the character referred to which is simple in structure, particularly effective in indicating the intention of the driver of the equipped vehicle to make either a right hand or left hand turn and to provide means associated with the signal and located preferably on the instrument panel, to indicate whether or not the signalling lamps are functioning properly.

Further objects of my invention are to provide a vehicle direction signal wherein two red signal lamps are disposed on opposite sides of a green signal lamp, all of which lamps are segregated by being located in individual compartments so as to more effectively separate and define the light rays emanating from the lamps and further, to provide simple means for intermittently "flashing" the red signal lamps when same are energized, thus tending to render the signal more noticeable to the drivers of vehicles approaching the equipped vehicle from both front and rear.

With the foregoing and other objects in view, my invention consists in certain novel features of construction and arrangement of parts which will be hereinafter more fully described, claimed and illustrated in the accompanying drawing, in which:

Fig. 1 is a view partly in vertical section and partly diagrammatic, of my improved signal.

Fig. 2 is a horizontal section taken on the line 2—2 of Fig. 1.

Referring by numerals to the accompanying drawing which illustrates a preferred embodiment of my invention, 10 designates a housing preferably of sheet metal, having two partitions 11, thus forming three separate lamp chambers and this housing is suitably secured on the vehicle at a point where it is readily visible to the drivers of vehicles approaching from front or rear, for instance, the rear left hand portion of the vehicle. In Fig. 1, I have shown the housing mounted transversely on top of the rear left hand fender F. Seated in the front and rear walls of the central one of the chambers in the housing, are discs or lenses 12, of green transparent material, such as glass or plastics and seated in the said walls between the partitions and end of the housing are discs or lenses 13, of red transparent material such as glass or plastics.

Suitably mounted in the central chamber within housing 10, is a socket containing an electric lamp 14 and sockets within the end chambers receive electric lamps 15 and 16 respectively.

Suitably located within the equipped vehicle, preferably on the instrument board, is a conventional switch which may include a base 17 of insulation on which is arranged to slide, a contact plate 18 and the latter being adapted to engage, when moved to the left, three contacts 19, 20 and 21, and when moved to the right, said plate engages three contacts 22, 23 and 24.

Suitably mounted within the equipped vehicle, preferably on the instrument panel, is a green pilot lamp 25 and on opposite sides thereof are red pilot lamps 26 and 27. Leading from a battery 28, is a conductor 29, having branches 30 and 31, leading to contacts 19 and 22 respectively and leading respectively from contacts 20 and 23 are branches 32 and 33 of a conductor 34 which leads to the socket of lamp 14, in the central chamber of housing 10. A conductor 35 leads from contact 21 to the socket of lamp 15, with a conventional "flasher" 36 located in said conductor and a conductor 36 in which is located a "flasher" 38, leads from contact 24 to the socket of lamp 16.

A conductor 39 leads from the socket for lamp 14 to pilot lamp 25 and conductors 40 and 41 lead to pilot lamps 26 and 27, respectively.

When plate 18 is in a central or "off" position as seen in Fig. 1, there is no current flow through the system and thus same is out of service.

To operate the signal, the driver of the equipped vehicle about to make a left hand signal, moves slide 18 toward the left, thus engaging said slide with contacts 19, 20 and 21, thus closing the circuits from battery 28 to signal lamps 14 and 15 and also to pilot lamps 25 and 26, to indicate that the proper signal lamps are lighted.

The current flow through conductor 35 will be intermittently interrupted, thereby flashing left hand red signal lamp 15, while green lamp 19 burns continuously, thus providing a readily visible signal of the left hand turn to be made by the vehicle.

When contact plate is shifted to its limit of movement toward the right hand, contacts 22, 23 and 24 are engaged, so as to close the circuits to green signal lamp 14 and right hand red signal lamp 16, which latter flashes as a result of interrupted current flow through member 38 and at the the same time, current flow to pilot lamps 25 and 27 lights same to show that the signal is functioning properly. Thus, when the signal is operated, the drivers of vehicles approaching the equipped car from front and rear will readily note a turning signal consisting of a continuous green light and a flashing red light to one side or the other thereof.

An especially desirable feature of my invention is combining, in a direction signal, a constant green light with flashing red lights and the location of all signal lamps in separate compartments in the lamp housing, so that none of the direct rays of light from the segregated lamps can enter the compartments occupied by the other lamps, which function materially increases the visibility and efficiency of the signal.

Thus, it will be sen that I have provided a flashing direction signal for motor vehicles, which is simple in structure, inexpensive of manufacture and very effective in performing the functions for which it is intended. Minor changes in the size, form and construction of the various parts of my improved signal may be made and substituted for those herein shown and described, without departing from the spirit of my invention, the scope of which is set forth in the appended claims.

I claim as my invention:

In a motor vehicle direction signal, the combination with a housing having three separate compartments, the central one of which has transparent green front and rear windows, the other two compartments having transparent red front and rear windows, an electric lamp within each compartment, a source of electrical energy, conductors leading from said source of electrical energy to said lamps, a switch connected to said conductors for selectively closing the circuits between said source of electrical energy and the lamp in the compartment having the green windows and either one of the lamps in the compartments having the red windows and means whereby the energization of the lamps in the compartments having the red windows is rendered intermittent.

OSCAR P. WYATT.

REFERENCES CITED

The following references are of record in the file of this patent:

UNITED STATES PATENTS

| Number | Name | Date |
|---|---|---|
| 1,288,519 | Colnot | Dec. 24, 1918 |
| 1,638,706 | Que | Aug. 9, 1927 |
| 1,848,685 | Wyatt | Mar. 8, 1932 |
| 2,201,657 | Westland | May 21, 1940 |
| 2,243,472 | Roan et al. | May 27, 1941 |